US 11,578,480 B2

(12) United States Patent
Burke et al.

(10) Patent No.: US 11,578,480 B2
(45) Date of Patent: Feb. 14, 2023

(54) GREASE INTERCEPTOR AND METHOD OF USE THEREOF

(71) Applicant: Oldcastle Precast Inc., Auburn, WA (US)

(72) Inventors: Andrew Burke, Littleton, CO (US); Jackson Bishop, Castle Pines, CO (US); Matthew Kirby, Denver, CO (US)

(73) Assignee: Oldcastle Precast Inc., Auburn, WA (US)

( * ) Notice: Subject to any disclaimer, the term of this patent is extended or adjusted under 35 U.S.C. 154(b) by 353 days.

(21) Appl. No.: 15/883,877

(22) Filed: Jan. 30, 2018

(65) Prior Publication Data
US 2018/0216335 A1 Aug. 2, 2018

Related U.S. Application Data

(60) Provisional application No. 62/451,898, filed on Jan. 30, 2017.

(51) Int. Cl.
*E03F 5/16* (2006.01)
*C02F 1/40* (2023.01)
*B01D 17/02* (2006.01)

(52) U.S. Cl.
CPC ............ *E03F 5/16* (2013.01); *B01D 17/0208* (2013.01); *C02F 1/40* (2013.01)

(58) Field of Classification Search
None
See application file for complete search history.

(56) References Cited

U.S. PATENT DOCUMENTS

| 2,143,248 | A | * | 1/1939 | Otto | C02F 3/28 |
| | | | | | D23/203 |
| 3,426,903 | A | * | 2/1969 | Olecko | C02F 3/28 |
| | | | | | D23/203 |
| 3,630,370 | A | * | 12/1971 | Quina | E03F 11/00 |
| | | | | | 210/538 |
| 3,875,066 | A | * | 4/1975 | Lind | B01D 21/2427 |
| | | | | | 210/521 |
| 4,097,380 | A | * | 6/1978 | Carlson | C02F 3/28 |
| | | | | | 210/170.08 |
| 4,334,991 | A | * | 6/1982 | Beede | E03F 11/00 |
| | | | | | 210/232 |
| 4,406,789 | A | | 9/1983 | Brignon | |
| 4,832,846 | A | * | 5/1989 | Gavin | B01D 21/0087 |
| | | | | | 210/534 |

(Continued)

*Primary Examiner* — Chester T Barry
(74) *Attorney, Agent, or Firm* — Sheridan Ross P.C.

(57) ABSTRACT

A grease interceptor and method of use thereof is provided for separating solids, fats, oils, and grease waste ("F.O.G."), and other particulate matter. The grease interceptor receives waste water in a liquid storage area where solids in the waste water have residence time long enough to gravitationally separate towards the bottom of the liquid storage area and waste that is less dense than water floats to the top of the liquid storage area. A series of features including channels, interrupter plates, and walls can increase the residence time or otherwise improve the separation of waste from the water. In addition, embodiments of the grease interceptor can have tapered access holes that improve visual inspection of the liquid storage area of the grease interceptor.

13 Claims, 7 Drawing Sheets

(56) References Cited

U.S. PATENT DOCUMENTS

| | | | | |
|---|---|---|---|---|
| 4,985,148 | A * | 1/1991 | Monteith | B01D 17/00 |
| | | | | 210/519 |
| 5,101,849 | A * | 4/1992 | Richard | E03F 5/105 |
| | | | | 137/15.01 |
| 5,178,754 | A | 1/1993 | Batten et al. | |
| 5,453,197 | A | 9/1995 | Strefling | |
| 5,484,524 | A * | 1/1996 | MacLaren | C02F 3/101 |
| | | | | 210/151 |
| 6,012,020 | A * | 1/2000 | Gardell | G01S 15/88 |
| | | | | 702/50 |
| 6,200,470 | B1 * | 3/2001 | Romero | B01D 21/0042 |
| | | | | 210/170.06 |
| 6,328,890 | B1 | 12/2001 | Thibault | |
| 7,018,536 | B2 * | 3/2006 | Couch | C02F 3/121 |
| | | | | 210/622 |
| 7,641,805 | B2 | 1/2010 | Batten et al. | |
| 8,202,432 | B2 * | 6/2012 | Al-Ghamdi | E03F 5/16 |
| | | | | 210/748.11 |
| 2002/0003104 | A1 | 1/2002 | Evanovich et al. | |
| 2002/0139736 | A1 * | 10/2002 | Stever | B01D 17/0211 |
| | | | | 210/170.03 |
| 2007/0068878 | A1 * | 3/2007 | Stever | B01D 21/2405 |
| | | | | 210/747.3 |
| 2009/0217772 | A1 * | 9/2009 | Reeve | G01F 1/42 |
| | | | | 73/861.47 |
| 2010/0181237 | A1 * | 7/2010 | Duran | B01D 21/0006 |
| | | | | 210/162 |
| 2015/0122728 | A1 * | 5/2015 | Whiteside | C02F 1/40 |
| | | | | 210/519 |
| 2015/0152629 | A1 * | 6/2015 | Bird | E03F 5/16 |
| | | | | 210/739 |
| 2016/0326033 | A1 * | 11/2016 | Potts | C02F 3/046 |
| 2021/0140164 | A1 * | 5/2021 | Brown | E03F 5/024 |

* cited by examiner

GREASE INTERCEPTOR AND METHOD OF USE THEREOF

CROSS REFERENCE TO RELATED APPLICATIONS

This application claims priority under 35 U.S.C. § 119(e) to U.S. Provisional Patent Application Ser. No. 62/451,898 filed Jan. 30, 2017, which is incorporated herein in its entirety by reference.

FIELD OF THE INVENTION

The present invention relates to the field of fluid/solid separation and filtration, and specifically, to a grease interceptor for separating solids and fat, oils, and grease from waste water.

BACKGROUND OF THE INVENTION

Historically, interceptors or grease traps have been used in restaurants and other commercial facilities to limit the amount of grease and solid waste carried into sewer systems via waste water. Typical grease interceptors can be categorized as either passive grease interceptors or automatic grease interceptors. Passive grease interceptors require that waste be periodically emptied from the system to prevent waste build up inside a storage volume leading to the grease interceptor not performing as intended. Passive grease interceptors typically include a storage volume with an inlet that allows waste water to flow into the storage volume and an outlet that allows water to flow out of the storage volume. While the waste water is in the storage volume, less dense grease rises within the water to the uppermost level of the water while denser solids sink in the water and settle on the bottom of the storage volume for subsequent removal.

A significant problem with many grease interceptors is that incoming waste water may flush into and through the storage volume with such velocity that it disrupts the solids that have previously settled on the bottom of the storage volume, thereby reintroducing them into the body of water and potentially moving them further along the path of water flow and causing blockages within the storage volume. The incoming high velocity waste water flush and re-agitated solids may also disrupt the floating grease that has already been separated, causing it to potentially be reintroduced into the water flowing out of the storage volume and resulting in waste being expelled with the outflowing water instead of being detained within the storage volume as intended. This is especially true as the storage volume fills up with grease over time, causing the grease/water interface to occur closer to the grease trap bottom.

Another deficiency found in prior art grease interceptors is the inability to quickly and easily determine through visual inspection, the level or amount of the water or grease content within the interior of the storage volume. Prior art devices embody traditional vertical interior wall surfaces at manhole openings. This limits and impedes the angle of visual inspection, resulting in additional, often difficult effort on the part of an inspector to obtain an accurate assessment of the interior content levels.

Yet another deficiency of prior art grease interceptors is the inability to centralize the settlement of solids within the storage volume. As solids flow into the storage volume with the incoming waste water, the uninterrupted water flow creates currents within the storage volume that carry or distribute the solids into various corners or regions of the storage volume, thereby increasing the difficulty of cleaning out the solids from the bottom of the storage volume.

Therefore, there is a need for a grease interceptor that can minimize or prevent incoming high velocity water flows from disturbing either the already settled solids or the already separated grease, and thereby, minimize or prevent waste from leaving the storage volume with the outflowing water. There is also a need for a grease interceptor that can centrally locate the solids flowing into the storage volume when the solids are settled and remain undisturbed. In addition, there is a need for a new grease interceptor that embodies features allowing for increased visual inspection and thereby allowing for easier, faster, and more accurate visual assessment of the interior content levels. There is further a need for a more efficient, cost effective grease interceptor that allows the solids to settle in a centrally localized manner and thereby allows for an easier and faster cleanout of solids from the storage volume.

SUMMARY OF THE INVENTION

In view of the limitations found in the prior art for separating solids, fats, oils, grease ("F.O.G."), and other particulate matter from waste water, the present invention provides a new and useful grease interceptor and method of use thereof which is cost effective to fabricate, more universally functional, and more versatile in application and operation. It is an aspect of some embodiments of the present invention to provide a grease interceptor that comprises a series of channels that direct the flow of waste water through the grease interceptor to promote the separation of solids, F.O.G., and other particulate matter from the waste water. A channel can be positioned on the downstream side of an inlet or other aperture to redirect the flow of waste water into a new direction. By directing the waste water through a longer flow path, the residence time in the storage volume of the grease interceptor is increased, which promotes the separation of solids, F.O.G., and other particulate matter from the waste water. The longer residence times also results in more laminar flow, which also promotes the separation of particulate matter from the waste water. Similarly, a channel can be positioned on the upstream side of an outlet or other aperture to direct waste water around the channel before passing through the outlet or other aperture. Again, this causes the waste water to travel on a more circuitous path, which increases the residence time within the storage volume and helps separate solids, F.O.G., and other particulate matter from the waste water.

It is another aspect of embodiments of the present invention to provide a grease interceptor that comprises an interrupter plate, which can redirect the flow of waste water while maintaining a laminar characteristic of the flow that helps maintain the separation of solids, F.O.G., and other particulate matter from the waste water. In some embodiments, the interrupter plate can be positioned on an inner surface of the sidewalls and/or end walls that define the storage volume. The interrupter plate extends from the inner surface at an angle of between about 20 to 90 degrees, and more preferably about 90 degrees. As the flow of waste water impinges upon the interrupter plate, the momentum of the flow causes the waste water to move in a different direction. It will be appreciated that an interrupter plate can be positioned on any surface proximate to the flow of the waste water.

It is a further aspect of embodiments of the present invention to provide a grease interceptor that has improved visual inspection characteristics. Most devices are visually inspected through a port or aperture in the storage volume that provide only a limited view of the storage volume, which can lead to the premature cleaning or the delayed cleaning of the storage volume, and both scenarios are inefficient and undesirable. In the present invention, the structure that defines the port or apertures for visual inspection are tapered to increase the range of viewing angle. This ensures a more accurate inspection of the storage volume, which leads to more efficient cleanings of the storage volume of the grease interceptor.

It is another aspect of the present invention to provide a bottom member with a surface that tapers or slopes to a common area so that solids accumulate in the common area. With flat surfaces, the solids do not accumulate in a single area, which makes cleaning inefficient. A surface which tapers or slopes downward to a common area accumulates solids in a single location to make cleaning more efficient.

Embodiments of the present invention may incorporate different materials and methods of manufacture. For instance, forms can be used to receive concrete and produce the bottom member, sidewalls, and ends walls of the grease interceptor. A main concrete form can be comprised of a plurality of interconnecting panels which when connected together can create a plurality of voids into which the concrete mixture is poured. It will be appreciated that numerous methods of manufacturing and utilizing form components can result in the completed form required to fabricate a main precast concrete portion, and alternate embodiments of the invention may have various proportions of recess depths and sizes, thereby allowing for the addition or subtraction of mass and thus weight to the main precast concrete portion as needed.

An assembly of interior reinforcing components can be inserted into to the form prior to the concrete mixture and can serve to reinforce the structural integrity of the main precast concrete portion when the fabrication process is complete. The main assembly of interior reinforcing components may be comprised of one or more steel reinforcement members, whereby the reinforcing component may a single reinforcing member or a framework of a plurality of reinforcing members which define an apparatus having a diameter, length, width, and height, that is sufficiently less than the diameter, length, width, and height of the interior volume of the main concrete form in the assembled state, thereby allowing for an amount of concrete to completely surround the entirety of the main assembly of interior reinforcing components.

The main assembly of interior reinforcing components may be constructed of a variety of different suitable materials including but not limited in use to, metals, polymers, fiberglass, carbon fibers, metal/plastic composites, and other materials that can reinforce the main precast concrete portion. The concrete mixture, which may comprise a high grade concrete mixture, can then be created and poured into the main concrete form to surround the entirety of the main interior reinforcing component. Once the concrete is cured or hardened, the main precast body can be removed from the form and optionally finished by a variety of methods including but not limited to, texturing, staining, etching, polishing, glazing, sealing, color coating, and other finish methods. It will further be appreciated that the concrete used in the grease interceptor may comprise a variety of types and composition mixes having various combinations of ingredients such as cement, water, cementitious materials, and chemical and or mineral admixtures, and coloring agents. Concrete having antimicrobial properties including but not limited to antimicrobial agents may be incorporated into the mix composition.

One particular embodiment of the present invention is a grease interceptor for separating solids, fats, oils, grease ("F.O.G."), and other particulate matter from waste water, comprising a container having a bottom member and at least one sidewall extending from the bottom member, wherein the bottom member and the at least one sidewall define a storage volume; an inlet positioned on the container, the inlet configured to receive waste water into the storage volume; an inlet channel positioned in the storage volume and positioned over the inlet, the inlet channel configured to redirect a flow of waste water from the inlet toward at least one of the bottom member and a sidewall of the at least one sidewall; a middle wall positioned in the storage volume, the middle wall extending upwardly from the bottom member of the container, and the middle wall having an aperture configured to restrict the flow of waste water through the aperture such that particulate matter more dense than the waste water sinks to the bottom member below the aperture, and particulate matter less dense than the waste water flows to a surface of the waste water above the aperture for further removal; and an outlet positioned on the container, the outlet configured to expel waste water from the storage volume.

In some embodiments, the grease interceptor further comprises an outlet channel positioned in the storage volume and positioned over the outlet, wherein the outlet channel is configured to redirect the flow of waste water from the storage volume to the outlet. In various embodiments, the grease interceptor further comprises an interrupter plate positioned on an inner surface of the at least one sidewall, wherein a distance between the interrupter plate and the bottom member is larger than a distance between the aperture of the middle wall and the bottom member, and wherein the interrupter plate is configured to redirect the flow of waste water from the inlet channel to a direction parallel to the bottom member. In some embodiments, a flow path of the waste water is configured to be redirected at least two times to increase residence time within the storage volume of the container.

In various embodiments, the grease interceptor further comprises a first transfer channel positioned on an inlet side of the middle wall, the first transfer channel configured to redirect the flow of waste water into the aperture of the middle wall; and a second transfer channel positioned on an outlet side of the middle wall, the second transfer channel configured to redirect the flow of waste water out of the aperture of the middle wall. In some embodiments, the second transfer channel is configured to redirect the flow of waste water in a direction perpendicular to the bottom member. In various embodiments, the at least one sidewall is a single cylindrical sidewall having a substantially circular cross-sectional shape.

Another embodiment of the present invention is a grease interceptor for separating solids, fats, oils, grease ("F.O.G."), and other particulate matter from waste water, comprising a vessel having a bottom member and at least one sidewall extending from the bottom member; a lid positioned on an upper end of the at least one sidewall, wherein the bottom member, the at least one sidewall, and the lid define an enclosed volume; an inlet on the vessel, the inlet configured to receive waste water into the enclosed volume; an outlet on the vessel, the outlet configured to expel waste water from the enclosed volume; a middle wall positioned in the enclosed volume, wherein the middle wall defines an upstream enclosed volume and a downstream enclosed volume, and the middle wall having an aperture configured to restrict a flow of waste water through the aperture such that particulate matter more dense than the waste water sinks to a bottom of the vessel below the aperture, and particulate matter less dense than the waste water flows to a surface of the waste water above the aperture for further removal, wherein the downstream enclosed volume has less concentration of particulate matter than the upstream enclosed volume; and an aperture on the lid, the aperture having a first diameter on an exterior surface of the lid and a second diameter on an interior surface of the lid, wherein the second diameter is larger than the first diameter to improve a visual inspection of the enclosed volume from outside the vessel.

In some embodiments, a plurality of grade rings forms the aperture. In various embodiments, the lid further comprises a vent extending from the enclosed volume to an ambient environment outside of the vessel. In some embodiments, the lid has a continuously sloped surface between the first diameter and the second diameter. In various embodiments, the grease interceptor further comprises an interrupter plate positioned on an inner surface of the at least one sidewall between the inlet channel and the bottom member, the interrupter plate is configured to redirect the flow of waste water. In some embodiments, the middle wall comprises a first plate having a centering aperture and a second plate having the aperture, wherein the centering aperture is larger than the aperture, and the second plate is movable relative to the first plate in a planar direction of the plates to move a position of the aperture.

Yet another particular embodiment of the present invention is a method for separating solids, fats, oils, grease ("F.O.G."), and other particulate matter from waste water, comprising (i) providing a vessel having a storage volume, the vessel having an inlet to the storage volume and having an outlet from the storage volume, wherein a water level is established by the inlet and the outlet; (ii) providing a middle wall in the storage volume, the middle wall extending from a bottom surface of the vessel to above the water level to divide the storage volume into a first storage volume and a second storage volume, the middle wall having an aperture positioned between the bottom surface and the water level; (iii) supplying a waste water through the inlet at an inlet velocity, the waste water having particulate matter; (iv) restricting the waste water through the aperture in the middle wall to separate at least some of the particulate matter from the water such that particulate matter more dense than the waste water sinks to the bottom of the vessel below the aperture, and particulate matter less dense than the waste water flows to the water level above the aperture for further removal; and (v) redirecting the waste water into an outlet velocity through the outlet.

In some embodiments, the method further comprises (vi) providing an inlet channel in the first storage volume, wherein the inlet channel is positioned over the inlet; and (vii) redirecting, by the inlet channel, the waste water from the inlet velocity to a first intermediate velocity toward the bottom surface of the storage volume. In various embodiments, the method further comprises (viii) providing an interrupter plate in the first storage volume, wherein the interrupter plate is positioned on an inner surface of the vessel; and (ix) redirecting, by the interrupter plate, the waste water from the first intermediate velocity to a second intermediate velocity.

In some embodiments, the method further comprises (x) providing a first transfer channel in the first storage volume, wherein the first transfer channel is positioned over the aperture in the middle wall; (xi) providing a second transfer channel in the second storage volume, wherein the second transfer channel is positioned over the aperture in the middle wall; (xii) redirecting, by the first transfer channel, the waste water from the first storage volume into the aperture in the middle wall; and (xiii) redirecting, by the second transfer channel, the waste water from the aperture in the middle wall and into the second storage volume. In various embodiments, the method further comprises (xiv) providing an outlet channel in the second storage volume, wherein the outlet channel is positioned over the outlet, the outlet channel having at least one aperture positioned proximate to a bottom end of the outlet channel; (xv) redirecting, by the outlet channel, the waste water out of the outlet at the outlet velocity. In various embodiments, a distance between the interrupter plate and the bottom surface is larger than a distance between the aperture of the middle wall and the bottom surface. In some embodiments, the bottom surface slopes down to one of a central bottom surface and central bottom point.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the invention. Moreover, references made herein to "the invention" or aspects thereof should be understood to mean certain embodiments of the invention and should not necessarily be construed as limiting all embodiments to a particular description. The invention is set forth in various levels of detail in the Summary of the Invention as well as in the attached drawings and Detailed Description and no limitation as to the scope of the invention is intended by either the inclusion or non-inclusion of elements, components, etc. in this Summary of the Invention. Additional aspects of the invention will become more readily apparent from the Detailed Description particularly when taken together with the drawings.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures.

Figure 1:
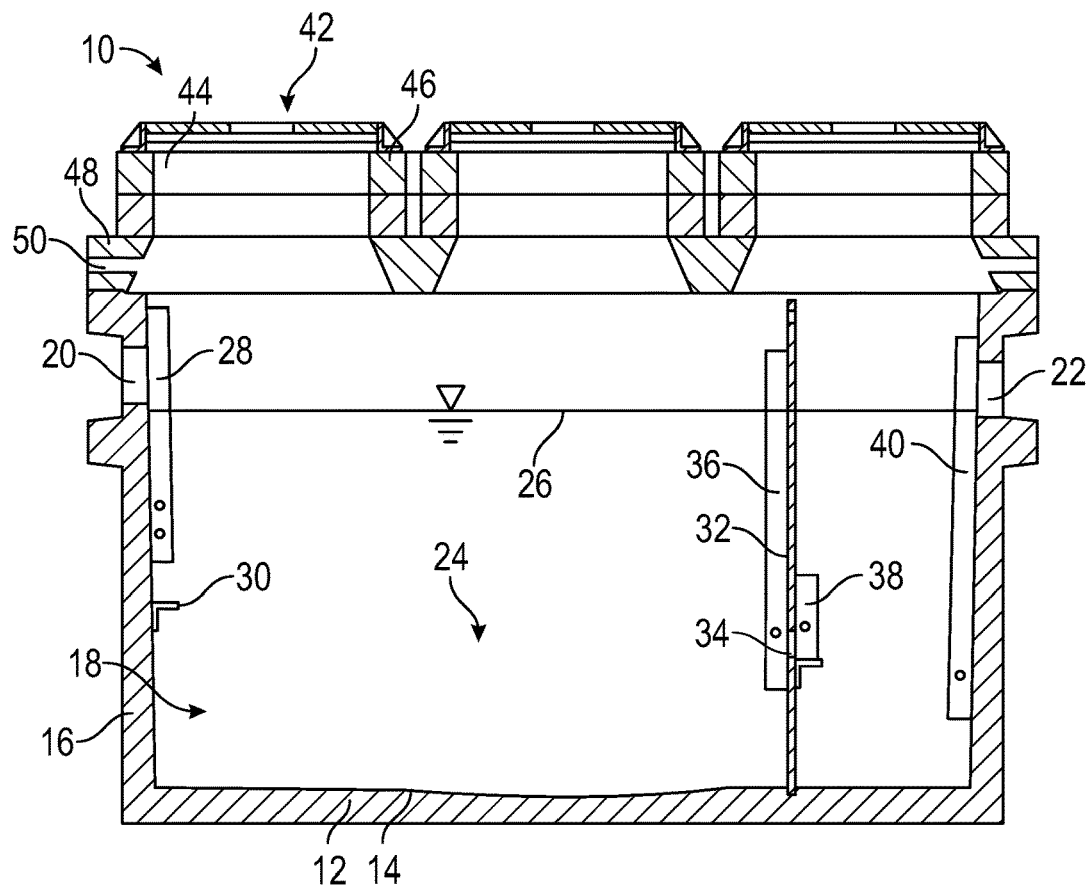
FIG. 1 is a cross-sectional front elevation view of a grease interceptor in accordance with various embodiments of the present invention.

To assist in the understanding of the embodiments of the invention the following list of components and associated numbering found in the drawings is provided herein:

| Component No. | Component |
| --- | --- |
| 10 | Grease Interceptor |
| 12 | Bottom Member |
| 14 | Sloped Inner Surface |
| 16 | Sidewall |
| 18 | Storage Volume |
| 20 | Inlet |
| 22 | Outlet |
| 24 | Waste Water |
| 26 | Surface Level |
| 28 | Inlet Channel |
| 30 | Interrupter Plate |
| 32 | Middle Wall |
| 34 | Aperture |
| 36 | First Transfer Channel |
| 38 | Second Transfer Channel |
| 40 | Outlet Channel |
| 42 | Cover |
| 44 | Aperture |
| 46 | Grade Ring |
| 48 | Tapered Surface |
| 50 | Vent |

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

The invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the art, and may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the invention are described herein and as depicted in the drawings. It is expressly understood that although the figures illustrate containers, channels, etc., the invention is not limited to these embodiments. Further, the terms "grease interceptor" and "grease trap" and "sidewall" and "end wall" may be used interchangeably.

Now referring to FIG. 1, a cross-sectional front elevation view of the grease interceptor 10 is provided. The grease interceptor 10 comprises a bottom member 12, which in this embodiment has a tapered floor surface 14, and one or more sidewalls or end walls 16. The bottom member 12 and sidewalls 16 at least partially define a storage volume 18 through which waste water flows through to separate solids, fats, oils, and grease ("F.O.G."), and other particulate matter from the waste water.

The bottom member 12 and the sidewalls 16 are generally planar and form a rectangular prism-shaped storage volume 18. However, it will be appreciated, that these components may have other shapes and combinations in other embodiments of the invention. For instance, the one or more sidewalls 16 may have a square, round, triangular, elliptical, etc. cross-sectional shape.

Some embodiments of the present invention may include at least one sump that is either recessed or resting on the floor surface 14 to remove accumulated waste from the storage volume 18. A single sump or multiple sumps may be recessed in the floor surface 14 or may be positioned directly on the floor surface 14 or in any combination thereof. A sloped or planar flat floor surface 14 can be utilized in some embodiments of the present invention. Further still, a further conduit may be in operable connection with the bottom of the sloped floor surface 14 for selective removal of accumulated waste and particulate matter, specifically solids that are denser that water. In these embodiments, a valve may define, at least in part, the sloped bottom surface 14. Then when waste or particulate matter has accumulated, the valve can open and allow waste to flow through the further conduit to be processed and disposed.

An inlet 20 for the flow of waste water is positioned at one end of the grease interceptor 10, and an outlet 22 is positioned at an opposing end. In various embodiments, the outlet 22 is positioned lower than the inlet 20 to promote the flow of waste water from the inlet 20 to the outlet 22. Between the inlet 20 and outlet 22, a volume of waste water 24 is contained in the storage volume 18. This volume of waste water 24 has a surface level 26 that is defined by the position of the outlet 22. It will be appreciated that the inlet 20 and outlet 22 can have a variety of dimensions and shapes such as various depth and height dimensions and various shapes including but not limited to, semicircular, triangular, rectangular, square, etc.

Next, a series of channels, interrupter plates, and walls direct the flow of waste water along a circuitous path to increase the residence time of the waste water in the grease interceptor 10, and thus, improve the ability of the grease interceptor 10 to separate solids, F.O.G., and other particulate matter from the waste water. First, an inlet channel 28 is positioned over the inlet 20. The top of the inlet channel 28 extends above the surface 26 of the waste water, and the bottom of the inlet channel 28 stops short of the bottom member 12. Thus, the waste water flowing through the inlet 20 is redirected downward in a new direction.

An interrupter plate 30 is positioned on an inner surface of the sidewall 16, and positioned between the bottom end of the inlet channel 28 and the bottom member 12. The interrupter plate 30 extends from the inner surface at an angle of between about 20 and 90 degrees, which in this embodiment is approximately 90 degrees, but it will be appreciated that the angle may range between 5 and 180 degrees. As the waste water flows out of the inlet channel 28, the waste water impinges upon the interrupter plate 30. The momentum of the waste water causes the waste water to flow into the bulk of the storage volume 18 to promote a generally laminar flow regime.

A middle wall 32 is positioned in the storage volume 18 and downstream of the inlet channel 28 and the interrupter plate 30. The middle wall 32 extends above the waste water surface level 26, and the middle wall 32 has an aperture 34. The middle wall 32 separates the storage volume 18 into an upstream volume and a downstream volume, and therefore, the waste water flows through the aperture 34 in the middle wall 32. The aperture 34 is positioned between the bottom member 12 and the surface level 26 such that particulates denser than water can settle below the aperture 34 and particulates less dense than water can rise above the aperture 34. Channels on either side of the middle wall 32 control how the waste water flows through the aperture 34 in the middle wall 32.

Varying characteristics of the aperture 34 can vary the performance and functionality of the vessel 20 and middle wall 32. For instance, the position of the aperture 34 between the bottom surface 14 and the water level 26 can vary in different embodiments. As shown in FIG. 1, the aperture 34 is positioned between a midpoint of the wall 32 and the bottom surface 14. However, if, for instance, the grease interceptor, or vessel, or container 10 is processing water waste with large amounts of denser-that-water solids, then it may be desirable to have the aperture 34 positioned between a midpoint of the wall 32 and the water level 26 to maximize the volume of water below the aperture 34 and the likelihood of separating denser particulate matter. In this sense, the middle wall 32 can be removable in different embodiments so that another middle wall 32 with different aperture 34 characteristics can be placed in the grease interceptor 10.

Similarly, the size of the aperture 34 can promote or inhibit the flow of the waste water 24 in different embodiments. Further still, the middle wall 32 can be adjustable itself without being removed from the grease interceptor 10. In one embodiment, the middle wall 32 comprises a first plate and a second plate where an aperture in the first plate is larger than an aperture in the second plate. Therefore, when the planar surfaces of the plates are positioned adjacent to each other, the apertures overlap and the flow path of the waste water is restricted through the smaller, second aperture. To vary the flow path of the waste water, the second plate is moved relative to the first plate. Therefore, while the second aperture has changed position, the second aperture is still aligned with at least a portion of the first aperture. As a result, the flow path is still restricted through the second aperture, but the flow path travels through a new location in the middle wall 32 that corresponds with the new position of the second aperture. A greater distance between the second aperture and the bottom surface would result in more particulate matter that is denser than water captured in the grease interceptor 10, and a smaller distance between the second aperture and the bottom surface would result in more particulate matter that is less dense than water captured in the grease interceptor 10.

A first transfer channel 36 is positioned on the inlet side of the middle wall 36, and the first transfer channel 36 extends above the waste water surface level 26. Thus, the waste water must enter the first transfer channel 36 through a bottom side of the channel before passing through the aperture 34. A second transfer channel 38 is positioned on an outlet side of the middle wall 36. The second transfer channel 38 is closed on a bottom end and does not extend to the waste water surface level 26. Therefore, when the waste water passes through the aperture 34, the second transfer channel 38 redirects the flow upwards. These transfer channels 36, 38 cause the waste water to travel on a more circuitous path, which increase the residence time of the waste water within the grease interceptor 10.

Next, an outlet channel 40 is positioned over the outlet 22. Like the inlet channel 28, the outlet channel 40 extends above the waste water surface level 26 and is open on a bottom end. Therefore, the waste water must enter the outlet channel 40 through the bottom end before exiting the storage volume 18 through the outlet 22. It will be appreciated that there can be many different numbers of channels, interrupter plates, apertures, and walls that take the waste water along a longer and more laminar path. For example, a channel or channels may redirect the flow path of the waste water along a lateral path as opposed to, or in addition to, the vertical flow paths show in FIG. 1. In addition, in some embodiments at least two redirections provide a longer and more laminar flow path. More preferred embodiments include at least three redirections. Further, the channels may comprise overflow openings having a variety of shapes including but not limited to, horizontal or vertical slots, hole perforations in a variety of patterns. As such, a change in direction through the slots or hole can promote the separate of particulate matter with a different density than water.

Still referring to FIG. 1, the grease interceptor comprises a cover or lid 42 that is positioned on an upper surface of the sidewalls 16 and encloses the storage volume 18. In this embodiment, three apertures 44 extend through the cover 42 and allow for visual inspection of the storage volume 18. In practice, manhole covers may be positioned over these apertures 44, and a person could pass through an aperture 44 to gain access to the storage volume 18 allowing, for example, a suction device to skim less dense particulate matter off of the water surface level 16 or to remove denser particular matter off of the bottom surface 14. One or more grade rings 46 can adjust the length of the aperture 44 to customize the dimensions of the grease interceptor 10. A tapered surface 48 is positioned below the grade rings 46 such that the diameter of the aperture 44 at an upper end of exterior surface of the cover 42 is less than the diameter of the aperture 44 at the lower end or interior surface of the cover 42, which improves the visually inspection the storage volume 18. It will be appreciated that the tapered surface 48 can include the grade rings 46 themselves. Alternatively or in addition, portion of the grease interceptor 10 may comprise a window or other transparent or translucent material to allow for visual inspection of the waste water 24.

The cover 42 further comprises one or more vents 50 having a diameter approximately one quarter of the cover 42 thickness. The vents 50 in FIG. 1 are generally positioned on the centers of the tapered surfaces 48 and extend from the tapered surfaces 48 to an exterior of the grease interceptor 10. These vents 50 can discharge pressure from the storage volume 18 due to the separation of solids, F.O.G., and other particulate matter from the waste water.

Figure 2:
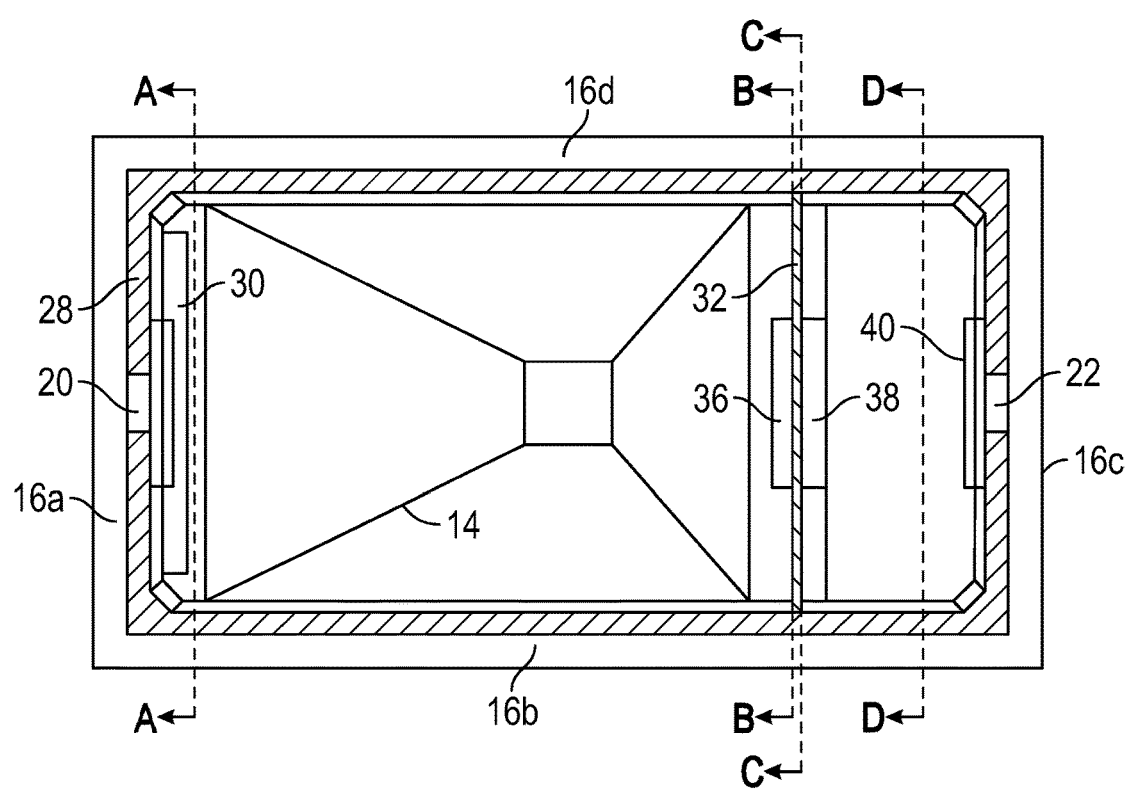
FIG. 2 is a cross-sectional top plan view of a grease interceptor in accordance with various embodiments of the present invention.

Now referring to FIG. 2, a cross-sectional top plan view of the grease interceptor 10 is provided. From this perspective, the contours of the tapered floor surface 14 are more apparent. As noted above, the tapered floor surface 14 allows for the accumulation of solids in a common area. In addition, the walls 16a-16d may be collectively referred to as sidewalls, and walls 16a and 16c may be referred to as end walls whereas walls 16b and 16d may be referred to as sidewalls.

Figure 3:
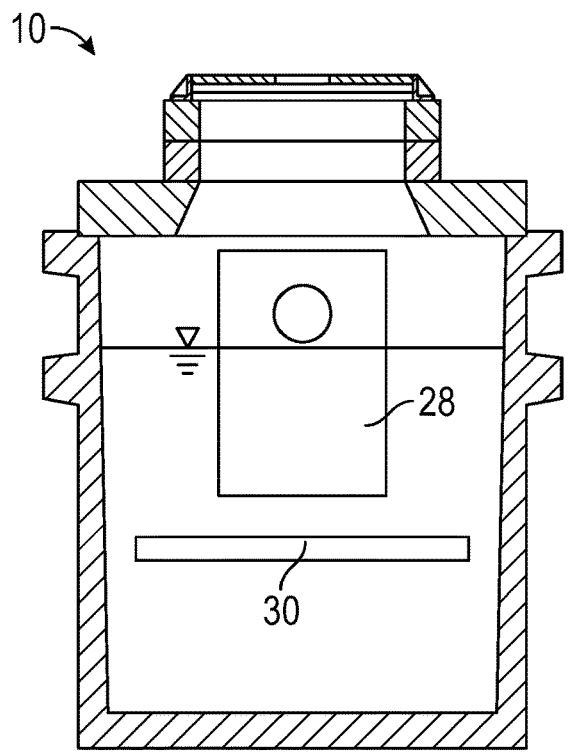
FIG. 3 is a cross-sectional side elevation view of a grease interceptor in accordance with various embodiments of the present invention.
Figure 4:
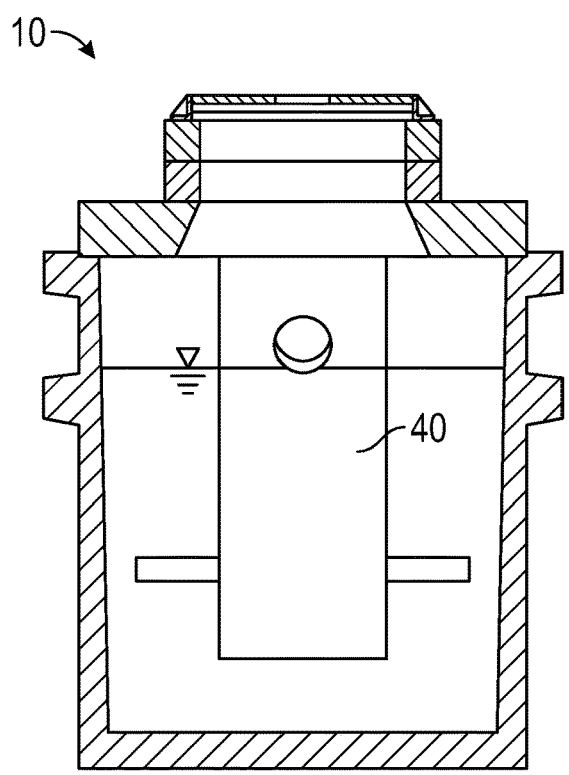
FIG. 4 is a cross-sectional side elevation view of a grease interceptor in accordance with various embodiments of the present invention.
Figure 5:
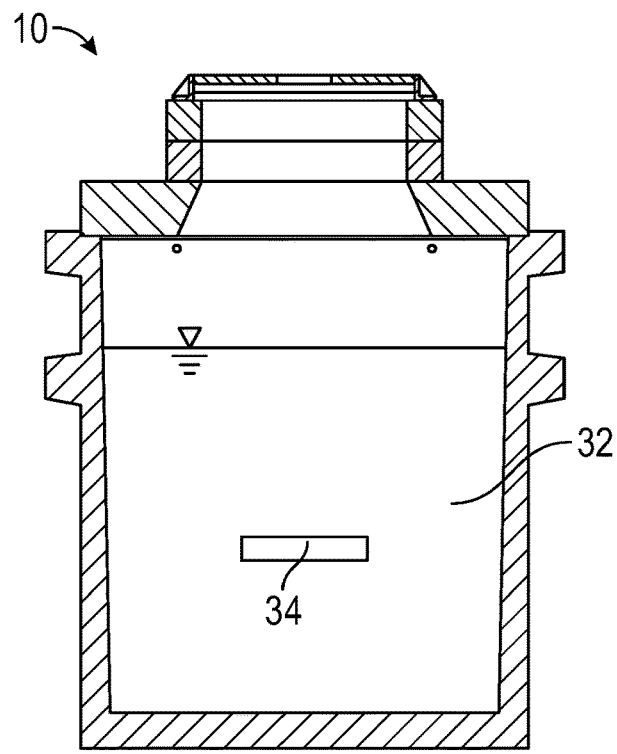
FIG. 5 is a cross-sectional side elevation view of a grease interceptor in accordance with various embodiments of the present invention.
Figure 6:
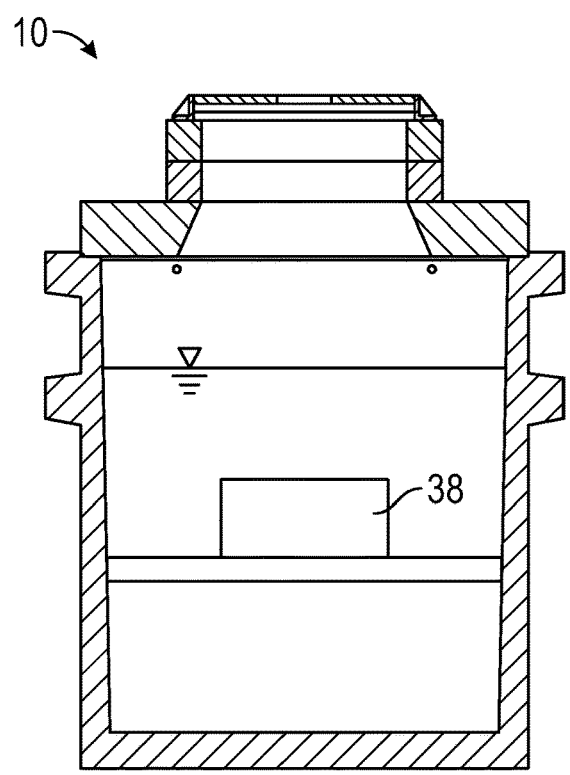
FIG. 6 is a cross-sectional side elevation view of a grease interceptor in accordance with various embodiments of the present invention.

Now referring to FIGS. 3-6, a series of cross-sectional side elevation views of the grease interceptor 10 are provided. These views are taken at various points along the length of the grease interceptor 10 in FIG. 2. FIG. 3 shows a cross-sectional view taken along line A-A in FIG. 2, FIG. 4 shows a cross-sectional view taken along line B-B in FIG. 2, FIG. 5 shows a cross-sectional view taken along line C-C in FIG. 2, and FIG. 6 shows a cross-sectional view taken along line D-D in FIG. 2.

Figure 7:
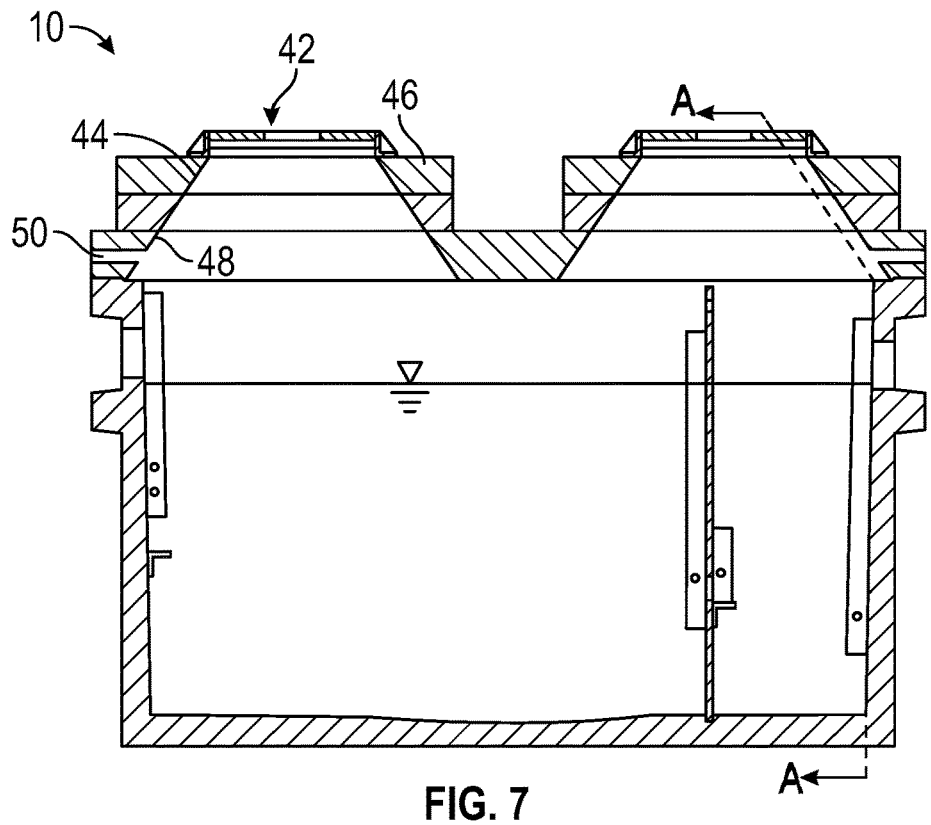
FIG. 7 is a cross-sectional front elevation view of a grease interceptor in accordance with various embodiments of the present invention.
Figure 8:
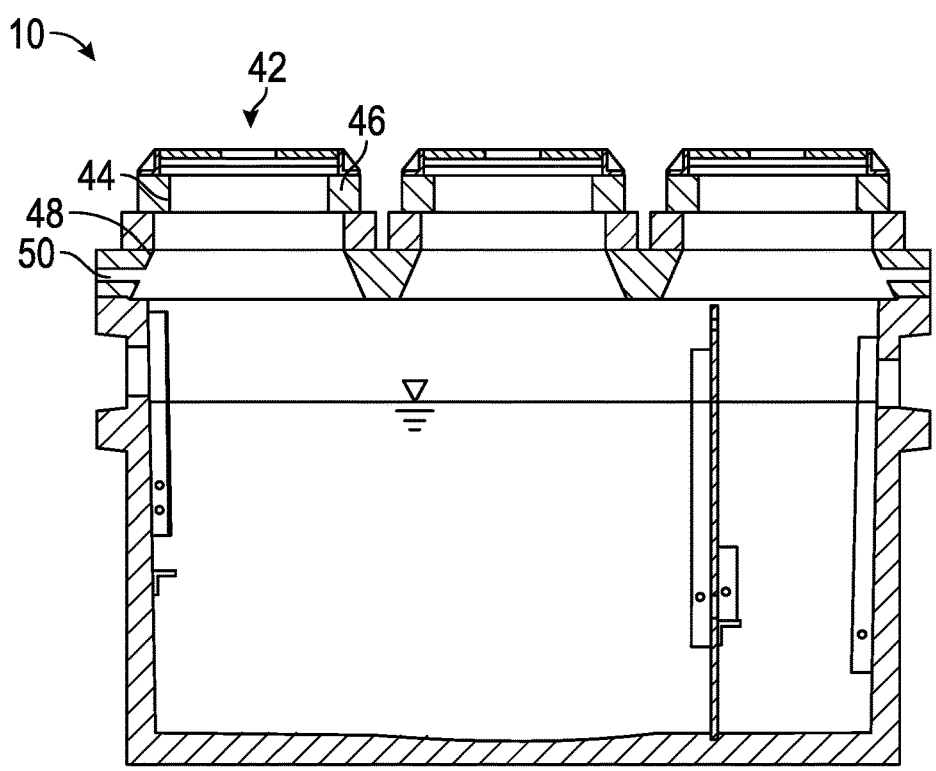
FIG. 8 is a cross-sectional front elevation view of a grease interceptor in accordance with various embodiments of the present invention.
Figure 9:
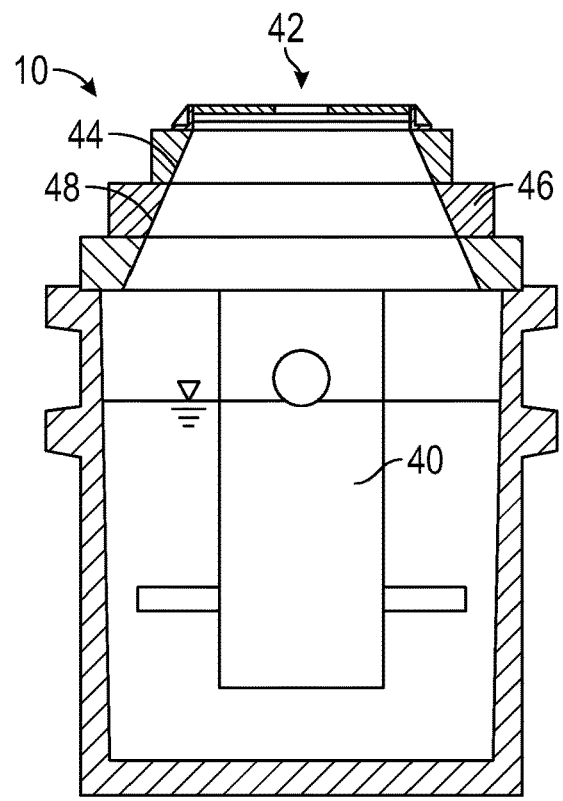
FIG. 9 is a cross-sectional side elevation view of a grease interceptor in accordance with various embodiments of the present invention.

Now referring to FIGS. 7-9, cross-sectional views of various embodiments of the cover 42 are provided. FIG. 7 shows a cover 42 having grade rings 46 that partially define the tapered surface 48. FIG. 9 is a cross-sectional view taken along line A-A in FIG. 7.

FIG. 8 shows a cover 42 having different sized grade rings 46 that have a sloped or angled interior generally vertical surface whereby the sloped or angled generally vertical surface angles from top to bottom away from the center of the grade rings 46 thereby creating a round opening through the grade rings 46 that is smallest at the top surface of the grade rings 46 and increases in size through the grade rings 46 resulting in the largest opening being at the bottom surface of the grade rings 46. This embodiment of grade rings 46 can be created in varying sizes whereby the grade rings 46 reduce in size as they are stacked on top of each other, and whereby the interior generally vertical surfaces of each grade ring 46 stacked one atop another are aligned in a planar manner creating a continuous cone-like opening through the grade rings 46 and thereby creating a larger enhanced viewing inspection area.

Figure 10:
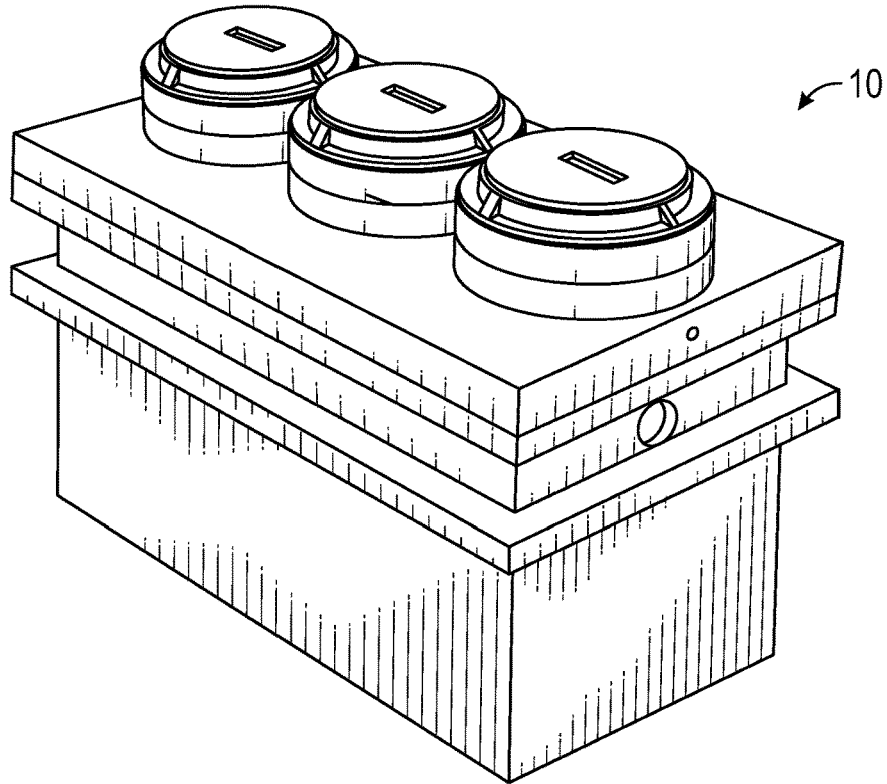
FIG. 10 is a perspective view of a grease interceptor in accordance with various embodiments of the present invention.
Figure 11:
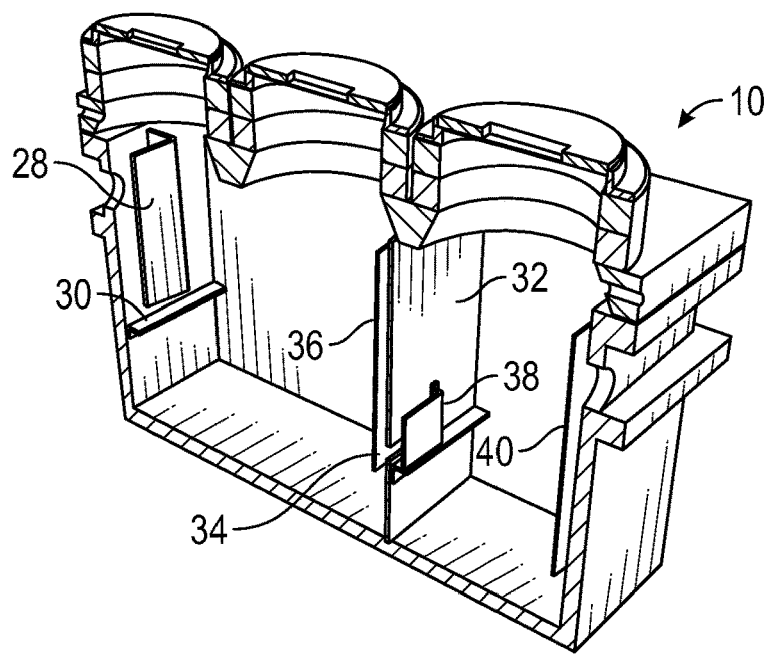
FIG. 11 is a cross-sectional perspective view of a grease interceptor in accordance with various embodiments of the present invention.
Figure 12:
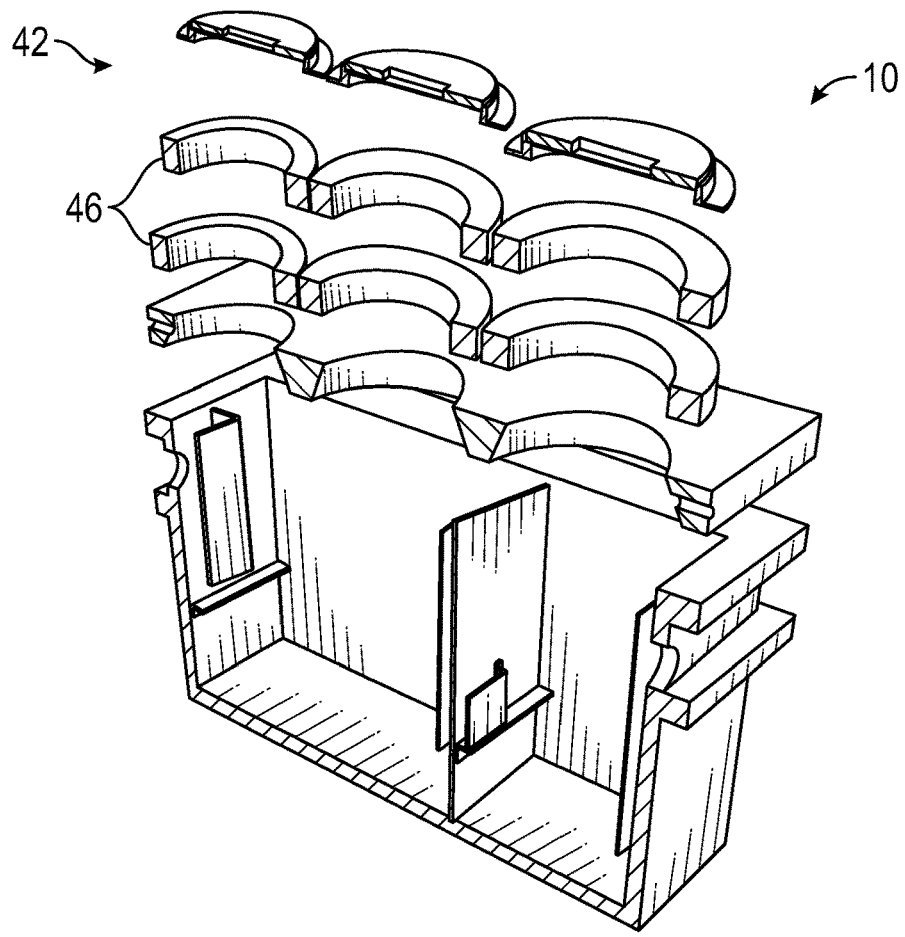
FIG. 12 is a cross-sectional, exploded perspective view of a grease interceptor in accordance with various embodiments of the present invention.
Figure 13:
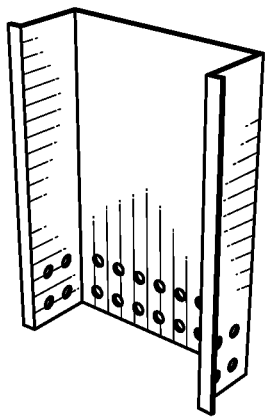
FIGS. 13-22 are perspective views of channels that could be used as inlet channels, outlet channels, transfer channels, etc. in accordance with various embodiments of the present invention.
Figure 14:
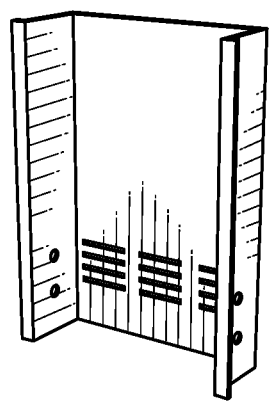
Figure 15:
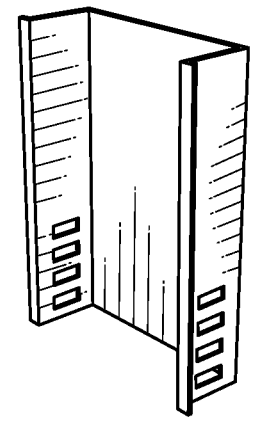
Figure 16:
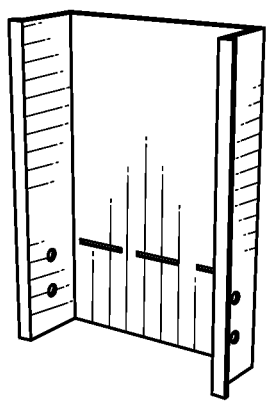
Figure 17:
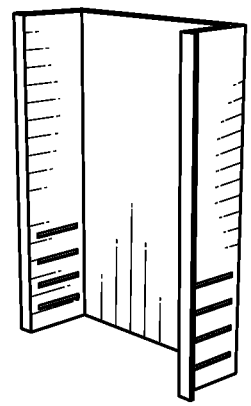
Figure 18:
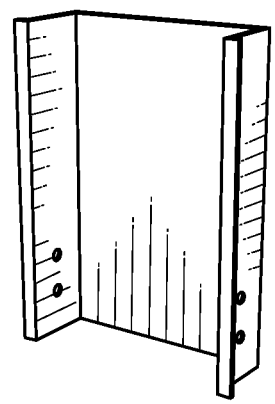
Figure 19:
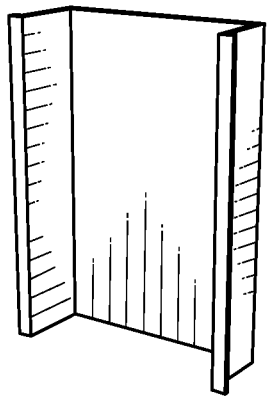
Figures 20, 21, 22:
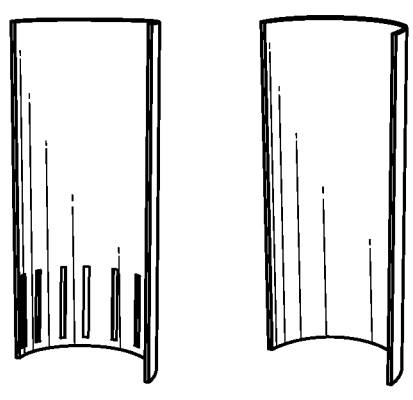

Now referring to FIGS. 10-12, various perspective views of the grease interceptor 10 are provided. FIG. 10 is a perspective view of the grease interceptor 10, showing a cover with three apertures. FIG. 11 is a cross-sectional perspective view of the grease interceptor 10 that shows the various channels, interruption plates, and apertures that direct the waste water along a circuitous path. FIG. 12 is a cross-sectional perspective view of the grease interceptor 10 that has an exploded rendering of the components that comprise the cover 42.

FIGS. 13-22 are perspective views of different embodiments of channels that have different cross-sectional shapes and different features. Some of the channels have additional features such as openings or slits in the body of the channels that promotes the separation of particulates from the water.

The invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed.

The phrases "at least one", "one or more", and "and/or", as used herein, are open-ended expressions that are both conjunctive and disjunctive in operation. For example, each of the expressions "at least one of A, B, and C", "at least one of A, B, or C", "one or more of A, B, and C", "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification, drawings, and claims are to be understood as being modified in all instances by the term "about."

The term "a" or "an" entity, as used herein, refers to one or more of that entity. As such, the terms "a" (or "an"), "one or more" and "at least one" can be used interchangeably herein.

The use of "including," "comprising," or "having," and variations thereof, is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts, and the equivalents thereof, shall include all those described in the summary of the invention, brief description of the drawings, detailed description, abstract, and claims themselves.

The foregoing description of the invention has been presented for illustration and description purposes. However, the description is not intended to limit the invention to only the forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Consequently, variations and modifications commensurate with the above teachings and skill and knowledge of the relevant art are within the scope of the invention. The embodiments described herein above are further intended to explain best modes of practicing the invention and to enable others skilled in the art to utilize the invention in such a manner, or include other embodiments with various modifications as required by the particular application(s) or use(s) of the invention. Thus, it is intended that the claims be construed to include alternative embodiments to the extent permitted by the prior art.

What is claimed is:

1. An apparatus for separating particulate matter from waste water, comprising:
   a container having a bottom member and at least one sidewall extending from said bottom member, wherein said bottom member and said at least one sidewall define a storage volume;
   an inlet positioned on said container, said inlet configured to receive said waste water into said storage volume;
   an inlet channel member positioned in said storage volume and adjacent to said inlet, said inlet channel member being positioned on an inlet sidewall of said at least one sidewall, said inlet channel member including an inlet-facing surface positioned a select distance from said inlet sidewall, said inlet channel member configured to redirect a flow of said waste water from said inlet toward at least one of said bottom member and said inlet sidewall;
   a middle wall positioned in said storage volume, said middle wall having a vertical portion extending upwardly from and connected to said bottom member of said container, said middle wall extending upwardly above an uppermost portion of said inlet and above an uppermost portion of said outlet, and said vertical portion of said middle wall having an aperture configured to restrict said flow of said waste water through said aperture such that any portion of the particulate matter more dense than said waste water sinks to said bottom member below said aperture, and any portion of the particulate matter less dense than said waste water floats to a surface of said waste water above the aperture for further removal;
   a first transfer channel member positioned on an inlet side of said middle wall and proximate said aperture, said first transfer channel member configured to redirect said flow of said waste water into said aperture of said vertical portion of said middle wall;
   a second transfer channel member positioned on an outlet side of said middle wall, said second transfer channel member configured to redirect said flow of said waste water out of said aperture of said vertical portion of said middle wall, wherein said second transfer channel member is closed at a lower end to redirect said flow of said waste water in a direction perpendicular to said bottom member; and
   an outlet positioned on said container, said outlet configured to expel said waste water from said storage volume.

2. The apparatus of claim 1, further comprising:
   an outlet channel member positioned in said storage volume and positioned over said outlet, wherein said outlet channel member is configured to redirect said flow of said waste water from said storage volume to said outlet.

3. The apparatus of claim 1, further comprising an interrupter plate positioned on an inner surface of said inlet sidewall, wherein a distance between said interrupter plate and said bottom member is larger than a distance between said aperture of said vertical portion of said middle wall and said bottom member, and wherein said interrupter plate is configured to redirect said inlet flow of said waste water from said inlet channel member to a direction parallel to a planar portion of said bottom member.

4. The apparatus of claim 1, wherein a flow path of said waste water is configured to be redirected at least two times to increase residence time within said storage volume of said container.

5. The apparatus of claim 1, further comprising a plate having a flow aperture, wherein said flow aperture and said plate are movable relative to said aperture of said vertical portion of said middle wall to vary a flowrate of waste water through said middle wall.

6. The apparatus of claim 1, wherein a portion of said bottom surface slopes down to one of a central bottom surface and central bottom point.

7. The apparatus of claim 1, further comprising:
   a lid positioned on an upper end of said at least one sidewall, wherein said bottom member, said at least one sidewall, and said lid define said storage volume; and
   a lid aperture on said lid, said lid aperture having a first diameter on an exterior surface of said lid and a second diameter on an interior surface of said lid, wherein said second diameter is larger than said first diameter to improve a visual inspection of said storage volume from outside said apparatus.

8. The apparatus of claim 7, wherein a plurality of grade rings form said lid aperture on said lid.

9. The apparatus of claim 7, wherein said lid further comprises a vent extending from said storage volume to an ambient environment outside of said apparatus.

10. The apparatus of claim 7, wherein said lid has a continuously sloped surface between said first diameter and said second diameter.

11. The apparatus of claim 1, wherein said middle wall is oriented in a vertical direction, and said middle wall is positioned closer to said outlet than said inlet in a horizontal direction.

12. An apparatus, comprising:
   a container having a bottom member and at least one sidewall extending from said bottom member, wherein said bottom member and said at least one sidewall define a storage volume;
   an inlet positioned on said container, said inlet configured to receive said waste water into said storage volume;
   an inlet channel member positioned in said storage volume and positioned over said inlet, said inlet channel member configured to redirect a flow of said waste water from said inlet toward at least one of said bottom member and a sidewall of said at least one sidewall;
   an interrupter plate positioned on an inner surface of an inlet sidewall of said at least one sidewall, wherein a distance between said interrupter plate and said bottom member is larger than a distance between said aperture of said vertical portion of said middle wall and said bottom member, and wherein said interrupter plate is configured to redirect said inlet flow of said waste water from said inlet channel member to a direction parallel to a planar portion of said bottom member;
   a middle wall positioned in said storage volume, said middle wall having a vertical portion extending upwardly from and connected to said bottom member of said container, said middle wall extending upwardly above an uppermost portion of said inlet and above an uppermost portion of said outlet, and said vertical portion of said middle wall having an aperture configured to restrict said flow of said waste water through said aperture such that any portion of the particulate matter more dense than said waste water sinks to said bottom member below said aperture, and any portion of the particulate matter less dense than said waste water floats to a surface of said waste water above the aperture for further removal; and an outlet positioned on said container, said outlet configured to expel said waste water from said storage volume.

13. An apparatus, comprising:

a container having a bottom member and at least one sidewall extending from said bottom member, wherein said bottom member and said at least one sidewall define a storage volume, wherein a portion of said bottom surface slopes down to one of a central bottom surface and central bottom point;

an inlet positioned on said container, said inlet configured to receive said waste water into said storage volume;

an inlet channel member positioned in said storage volume and positioned over said inlet, said inlet channel member configured to redirect a flow of said waste water from said inlet toward at least one of said bottom member and a sidewall of said at least one sidewall;

a middle wall positioned in said storage volume, said middle wall having a vertical portion extending upwardly from and connected to said bottom member of said container, said middle wall extending upwardly above an uppermost portion of said inlet and above an uppermost portion of said outlet, and said vertical portion of said middle wall having an aperture configured to restrict said flow of said waste water through said aperture such that any portion of the particulate matter more dense than said waste water sinks to said bottom member below said aperture, and any portion of the particulate matter less dense than said waste water flows to a surface of said waste water above the aperture for further removal; and an outlet positioned on said container, said outlet configured to expel said waste water from said storage volume.

* * * * *